United States Patent [19]
Sato et al.

[11] Patent Number: 5,422,699
[45] Date of Patent: Jun. 6, 1995

[54] PHOTOGRAPHIC CAMERA WITH VARIABLE FOCAL LENGTH

[75] Inventors: Shigemasa Sato, Yokohama; Masaru Muramatsu, Kawasaki; Sueyuki Oishi, Tokyo; Atsushi Shibayama, Kawasaki, all of Japan

[73] Assignee: Nikon Corporation, Tokyo, Japan

[21] Appl. No.: 257,443

[22] Filed: Jun. 8, 1994

Related U.S. Application Data

[63] Continuation of Ser. No. 9,743, Jan. 27, 1993, abandoned.

Foreign Application Priority Data

Jan. 31, 1992 [JP] Japan .................. 4-017031

[51] Int. Cl.$^6$ .................................................. G03B 13/36
[52] U.S. Cl. .................................. 354/400; 354/195.1
[58] Field of Search ............... 354/400, 402, 403, 406, 354/407, 408, 195.1, 195.12, 195.13; 352/140

[56] References Cited

U.S. PATENT DOCUMENTS

| | | |
|---|---|---|
| 3,442,193 | 5/1966 | Pagel . |
| 4,043,642 | 8/1977 | Hirose et al. . |
| 4,161,756 | 7/1979 | Thomas ..................... 352/140 |
| 4,497,547 | 2/1985 | Hayashi . |
| 4,633,072 | 12/1986 | Sugiura et al. . |
| 4,878,080 | 10/1989 | Takehana et al. ............. 354/403 |
| 4,914,454 | 4/1990 | Azuma et al. . |
| 4,929,069 | 5/1990 | Shibayama . |
| 4,962,400 | 10/1990 | Otani et al. ................... 354/195.1 |
| 5,173,807 | 12/1992 | Kaneda et al. ................. 354/402 |
| 5,189,458 | 2/1993 | Miyamoto et al. ............ 354/400 |
| 5,196,963 | 3/1993 | Sato et al. .................... 354/400 |
| 5,204,710 | 4/1993 | Tsukamoto et al. .......... 354/402 |
| 5,208,623 | 5/1993 | Takahashi ..................... 354/195.1 |

FOREIGN PATENT DOCUMENTS 61-167914  7/1986  Japan .
62-284317  10/1987  Japan .

Primary Examiner—Russell E. Adams
Attorney, Agent, or Firm—Oliff & Berridge

[57] ABSTRACT

This camera includes a control circuit 12 which calculates a movement amount for a focusing lens group $Z_1$ of a zoom lens 11 based upon the photographic distance R as measured by a distance measurement device 13 and the focal length of the zoom lens 11 as detected by a focal length detection device 15, and a lens driving device 18 which then moves the focusing lens group $Z_1$ according to this projection amount calculated by the control circuit 12. Thereby it is possible to compensate for focus deviation when zooming.

30 Claims, 10 Drawing Sheets

PHOTOGRAPHIC CAMERA WITH VARIABLE FOCAL LENGTH

This is a continuation of application Ser. No. 08/009,743 filed Jan. 27, 1993, now abandoned.

BACKGROUND OF THE INVENTION

1. Field of the Invention

The present invention relates to a camera of which the focal length can be varied, and more particularly relates to a camera equipped with a zoom lens in which it is possible adequately to compensate for focus deviation during zooming caused by the increase in magnification ratio and the shortening of the closest object-to-camera distance.

2. Related Background Art

A camera with automatic focus adjustment device (hereinafter termed an autofocus camera) is per se known (for example refer to U.S. Pat. No. 3,442,193), in which there is incorporated a non-TTL (Through The Taking Lens) distance measurement device employing the principle of distance measurement by triangulation, i.e. of an active autofocus device or a passive type or the like. Further, various zoom lenses suitable for compact cameras with the lens shutters have been proposed, as for example the one described in U.S. Pat. No. 4,929,069, which it is hereby not intended to admit as prior art to the present application except to the extent in any case stipulated by applicable law. Such non-TTL distance measuring devices as described above are currently being applied to autofocus cameras in commercial production.

With this type of zoom lens, in order to provide for reduction in size of the camera from the point of view of portability, the distance (the overall length of the zoom lens) from the end of the zoom lens in the direction towards the object to be photographed (hereinafter referred to as "object") to the image plane (the plane of the film) is increased during zooming. FIG. 7 is a figure showing the situation before and after zooming such a zoom lens.

In a zoom lens, the focal length is changed by moving lens groups along the optical axis in a predetermined manner. In the present specification a set of mutually adjacent lenses which move together as a unit is termed a lens group, and this term includes such a set all of which are stationary. The term $Z_1$ denotes a first lens group of the zoom lens, while the term $Z_2$ denotes a second lens group of the zoom lens. The first lens group $Z_1$, being the one by movement of which focus adjustment is performed, will therefore also be termed a focusing lens group; and it is moved forth or moved back (hereinafter referred to as "is projected") relative to the second lens group $Z_2$ according to the photographic distance (i.e. object-to-camera distance) R from the object H to the image plane F, and thereby automatic focus adjustment is performed, so as to focus a sharp and clear image of the object onto the image plane.

In practice, the photographic distance R is obtained by calculation from (a) the distance to the object H as measured by a distance measurement device 1, i.e. the distance from said distance measurement device 1 to said object, and (b) the distance from said distance measurement device 1 to the image plane F, which is a distance characteristic of the camera.

As shown in FIG. 7, even in the case that the photographic distance R is not altered during zooming of the zoom lens (i.e. is the same before and after zooming), nevertheless, since the overall length of the zoom lens changes from $l_1$ to $l_2$ due to its being zoomed, therefore the distance from the end point $Z_f$ of the zoom lens to the object H changes from $d_1$ to $d_2$ when the lens is zoomed. Accordingly, even if it be provisionally assumed that the proper projection amount to the best focus position for the first lens group $Z_1$ is not different before and after zooming, nevertheless, because the distance from the end point $Z_f$ of the zoom lens to the object H changes from $d_1$ to $d_2$ when the lens is zoomed, therefore after zooming focus deviation is bound to have been caused, even if focusing has been accurately performed before zooming.

In the prior art it has been possible to accommodate the amount of focus deviation associated with zooming within the focal depth of the zoom lens, and even without performing any particular focus correction it has in practice been possible to obtain properly focused photographs, even though the focus deviation has been neglected.

However zoom lenses of higher and higher magnification ratio, and of shorter and shorter closest photographic distance, have been contemplated recently, and the problem has arisen in their design and production that the amount of the above described focus deviation exceeds the focal depth of the zoom lens, so that the focus deviation can be neglected no longer.

In order to solve this problem, it has been conceived of to use a zoom lens whose overall length does not vary during zooming, as for example is disclosed in U.S. Pat. No. 4,497,547. However, this zoom lens presents lengthening and shortening difficulties from the point of view of portability, and is not well adapted for utilization with a compact camera.

Further, another means which has been contemplated for solution of the above outlined problem has been, during zooming, to move the non-TTL distance measurement device, which in the prior art was fixed with respect to the image plane, as one unit together with the focusing lens group of the zoom lens which is positioned closest to the object.

FIG. 8 is a figure showing a camera in which a focusing lens group provided at the end of the zoom lens closest to the object is moved as one unit together with a non-TTL distance measurement device. According to the operation of this FIG. 8 camera, the distances $d_3$ and $d_4$ before and after zooming from the end $Z_f$ of the zoom lens to the object H are equal to the distance value $d_0$ as measured by the non-TTL distance measurement device 1A, and the result of this is that the above described type of focus deviation does not occur. However, with this method, it is necessary to move the non-TTL distance measurement device 1A as one unit together with the focusing lens group provided at the end $Z_f$ of the zoom lens closest to the object, and the mechanical arrangements required in order thus to move the distance measurement device 1A invite an increase in the size and the weight of the camera, and therefore this solution is not well adapted for application to the case of a compact camera, in the same fashion as was the case with the proposal of the aforementioned U.S. Pat. No. 4,497,547.

SUMMARY OF THE INVENTION

The object of the present invention is to provide a photographic camera of variable focal length, which is capable of compensating for focus deviation when zooming caused by the increase in magnification ratio and the shortening of the photographic distance.

The present invention will be explained with reference to a zoom lens which comprises two lens groups, as shown in FIG. 1. In the interests of clarity of explanation, a first lens group $Z_1$ which is the focusing lens group for this zoom lens is shown in the figure as a thin lens, and may be of positive focal length or of negative focal length.

If the focal length of the first lens group is termed $f_1$, the distance to the object H from the position of this first lens group $Z_1$ when an object H located at infinity is in proper focus is termed d, and the amount (hereinafter termed the projection amount) by which the first lens group $Z_1$ is moved along the optical axis in order to bring into proper focus such an object H located at the position of distance d is termed $\Delta$, then the following relations hold between these quantities:

$$f_1^2 = \Delta(d - f_1 - \Delta) \quad (1)$$

$$\Delta = \frac{f_1^2}{d - f_1 - \Delta}$$

Here, because generally the distance d is very large as compared to the projection amount $\Delta$, this projection amount $\Delta$ is approximately given by the equation:

$$\Delta \simeq \frac{f_1^2}{d - f_1} \quad (2)$$

Further, since the focal length $f_1$ of the first lens group $Z_1$ is a constant value characteristic of this zoom lens, the projection amount $\Delta$ can be considered as a function $F_1$ of the distance d, thus:

$$\Delta = F_1(d) \quad (3)$$

Further, if the photographic distance from the object H to the image plane F is termed R, and the distance from the end of the first lens group $Z_1$ in the direction towards the object to the image plane F is termed the overall length of the zoom lens 1, then, because $d = R - l$, therefore the projection amount $\Delta$ may be considered as a function $F_2$ of the photographic distance R and the overall length l of the zoom lens, thus:

$$\Delta = F_2(R, l) \quad (4)$$

Next, the overall length l of the zoom lens can be expressed as a function $F_3$ of the focal length f of the zoom lens as a whole, thus:

$$l = F_3(f) \quad (5)$$

From equations (4) and (5), $\Delta$ can be obtained as a function $F_4$ of R and f, thus:

$$\Delta = F_4(R, f) \quad (6)$$

I.e., the projection amount $\Delta$ can be expressed as a function $F_4$ of the photographic distance R and the focal length f of the zoom lens as a whole. Because of the above facts, if the photographic distance R and the focal length f of the zoom lens as a whole, or alternatively the photographic distance R and the overall length l of the zoom lens, are known, then the amount of movement of this first lens group $Z_1$ required in order to produce proper focusing of this first lens group $Z_1$, i.e. the projection amount $\Delta$, can be determined.

Thus, in order to achieve the above described object of the present invention, there is proposed, according to a first aspect of the present invention, a photographic camera with variable focal length, having a zoom lens provided with a focusing lens group for performing focus adjustment, and a camera main body to which the zoom lens is provided, the distance from the focusing lens group to an image plane being varied during zooming of the zoom lens, comprising: a distance measurement means which detects the photographic distance from an object to the image plane; a parameter detection means which detects a parameter representative of the focal length to which the zoom lens is set, said parameter varying in accordance with the zooming of the zoom lens; a calculation means which calculates the amount of movement for the focusing lens group, based upon the photographic distance and upon the representative parameter; and a lens driving means which moves the focusing lens group according to the movement amount.

Further, in order to achieve the above described object of the present invention, there is proposed, according to another aspect of the present invention, a photographic camera with variable focal length, having a zoom lens provided with a focusing lens group for performing focus adjustment, and a camera main body to which the zoom lens is provided, the distance from the focusing lens group to an image plane being varied during zooming of the zoom lens, comprising: a distance measurement means which detects the photographic distance from an object to the image plane; a focal length detection means which detects the focal length to which the zoom lens is set; a calculation means which calculates the amount of movement for the focusing lens group, based upon the photographic distance and upon the focal length; and a lens driving means which moves the focusing lens group according to the movement amount.

The distance measurement means may preferably include a non-TTL distance detection device which has an optical system separate from the zoom lens. In addition, the focusing lens group may be preferably disposed closest to the object.

The zoom lens may preferably include a first lens group, which serves as the focusing lens group, and which is disposed closest to the object, with the calculation means calculating the amount of movement $\Delta$ for the first lens group using the following equation:

$$\Delta = \frac{f_1^2}{R} + \frac{f_1^2 \left( J \cdot f + K + f_1 + L \frac{1}{f} \right)}{R^2}$$

in which R denotes the photographic distance detected by the distance measurement means, f denotes the focal length detected by the focal length detection means, $f_1$ denotes the focal length of the first lens group, and J, K, and L denote constant values characteristic of the zoom lens. Alternatively, the zoom lens may preferably include a first lens group which is disposed closest to the object, and which is moved as a unit during zooming of the zoom lens; the first lens group comprising a front group, disposed on the side of the first lens group towards the object, which serves as the focusing lens group; with the calculation means calculating the amount of movement Δ for the front group using the following equation:

$$\Delta = \frac{f_F^2}{R} + \frac{f_F^2 \left( J \cdot f + K + f_F + L \frac{1}{f} \right)}{R^2}$$

in which R denotes the photographic distance detected by the distance measurement means, f denotes the focal length detected by the focal length detection means, $f_F$ denotes the focal length of the front group, and J, K, and L denote constant values characteristic of the zoom lens. In either of these cases, the zoom lens may preferably include a second lens group which is disposed on the side of the first lens group towards the image plane.

The zoom lens may preferably be mountable to and demountable from the camera main body; and, in this case, the camera may preferably further include a decision means which makes a decision whether or not to the camera main body there is fitted a zoom lens in which, when zooming of the zoom lens, the distance from the focusing lens group, which is disposed closest to the object, to the image plane changes; and, when a decision is reached by the decision means that to the camera main body there is fitted the zoom lens in which, when zooming of the zoom lens, the distance to the image plane from the focusing lens group which is disposed closest to the object changes, the calculation means may calculate the amount of movement for the focusing lens group based upon the detected photographic distance and upon the detected focal length; while, when a decision is reached by the decision means that to the camera main body there is not fitted the zoom lens in which, when zooming of the zoom lens, the distance to the image plane from the focusing lens group which is closest to the object changes, the calculation means may calculate the amount of movement for the focusing lens group based upon the detected photographic distance.

Further, in order to achieve the above described object of the present invention, there is proposed, according to another aspect of the present invention, a photographic camera with variable focal length having a zoom lens provided with a focusing lens group for performing focus adjustment, and a camera main body to which the zoom lens is provided, the distance from the focusing lens group to an image plane being varied during zooming of the zoom lens, comprising: a distance measurement means which detects the photographic distance from an object to the image plane; a lens overall length detection means which detects the overall length of the zoom lens from an end of the zoom lens in the direction towards the object to the image plane; a calculation means which calculates the amount of movement for the focusing lens group, based upon the photographic distance and upon the overall length of the zoom lens; and a lens driving means which moves the focusing lens group according to the movement amount.

The distance measurement means may preferably include a non-TTL distance detection device, which has an optical system separate from the zoom lens, and the focusing lens group may preferably be disposed closest to the object. In addition, the lens overall length detection means may preferably detect the overall length of the zoom lens as the distance to the image plane from the front side principal point of the focusing lens group, which is disposed closest to the object.

The zoom lens may preferably include a first lens group, disposed closest to the object, which serves as the focusing lens group, and the calculation means may calculate the amount of movement Δ for the first lens group using the following equation:

$$\Delta = \frac{f_1^2}{R - l - f_1}$$

in which R denotes the photographic distance detected by the distance measurement means, l denotes the overall length of the zoom lens detected by the lens overall length detection means, and $f_1$ is the focal length of the first lens group. Alternatively, the calculation means may preferably calculate the amount of movement Δ for the first lens group using the following equation:

$$\Delta = f_1^2 \left( \frac{1}{R} + \frac{l + f_1}{R^2} \right)$$

in which the symbols denote the same quantities as described proximately above.

The zoom lens may be preferably mountable to and demountable from the camera main body; and, in this case, the camera may preferably further include a decision means which makes a decision whether or not to the camera main body there is fitted a zoom lens in which, when zooming of the zoom lens, the distance from the focusing lens group, which is disposed closest to the object, to the image plane changes; and, when a decision is reached by the decision means that to the camera main body there is fitted the zoom lens in which, when zooming of the zoom lens, the distance to the image plane from the focusing lens group which is disposed closest to the object changes, the calculation means may calculate the amount of movement for the focusing lens group based upon the detected photographic distance and upon the detected overall length of the zoom lens; while, when a decision is reached by the decision means that to the camera main body there is not fitted the zoom lens in which, when zooming of the zoom lens, the distance to the image plane from the focusing lens group which is disposed closest to the object changes, the calculation means may calculate the amount of movement for the focusing lens group based upon the detected photographic distance.

The lens overall length detection means may preferably detect the overall length of the zoom lens in accordance with the position of the focusing lens group, along the optical axis of the zoom lens, relative to the remainder of the zoom lens.

With the present invention as described above, the calculation means calculates the amount of projection of the focusing lens group according to equation (6) above, based upon the photographic distance as detected by the distance detection means and the focal length of the zoom lens as detected by the focal length detection means, and the lens driving means moves the focusing lens group according to this calculated projection amount, thus performing focus adjustment to obtain a clear picture. Alternatively, the calculation means calculates the amount of projection of the focusing lens group according to equation (4) above, based upon the photographic distance as detected by the distance detection means and the overall length of the zoom lens as detected by the lens overall length detection means, and the lens driving means moves the focusing lens group according to this calculated projection amount, thus performing focus adjustment to obtain a clear picture. The focal length of the zoom lens, and likewise the overall length of the zoom lens, is a parameter that varies when the zoom lens is zoomed; and therefore, by calculating the projection amount for the focusing lens group while taking the value of one or the other of these parameters into account, focus deviation when zooming the zoom lens can be corrected for. In this way, it is possible to apply a zoom lens which has high magnification ratio and/or short closest photographic distance.

DETAILED DESCRIPTION OF THE PREFERRED EMBODIMENTS

First Embodiment

A first embodiment of the photographic camera of the present invention will now be explained: this first embodiment is adapted for a compact autofocus camera in which a zoom lens is housed within the main body of the camera.

Figure 1:
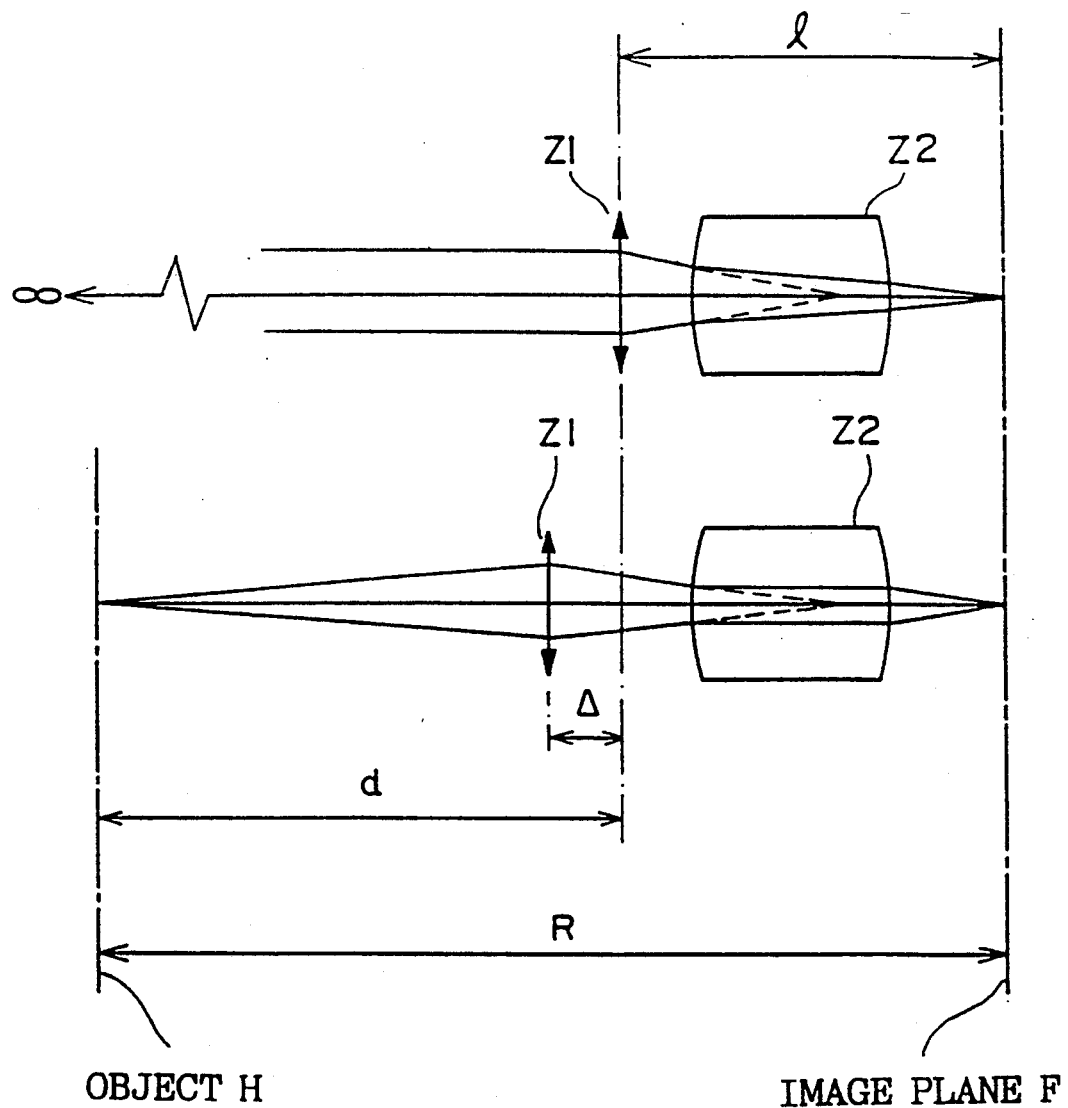
FIG. 1 is a figure for explaining a method of calculation for the projection amount for a focusing lens group for a zoom lens, in order to focus the zoom lens, according to the present invention.
Figure 2:
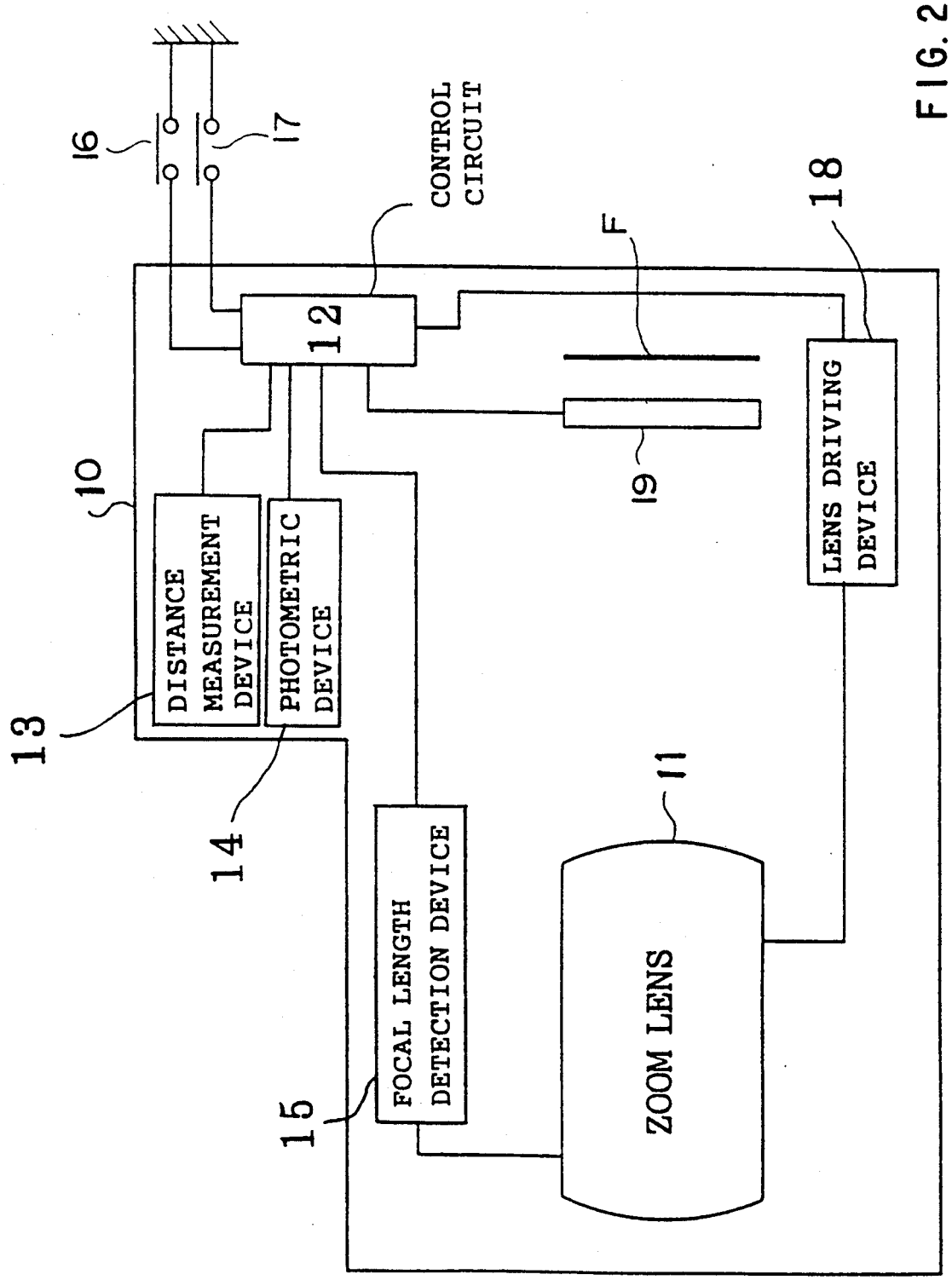
FIG. 2 is a block diagram showing the general construction of the first embodiment of the camera of the present invention.
Figure 7:
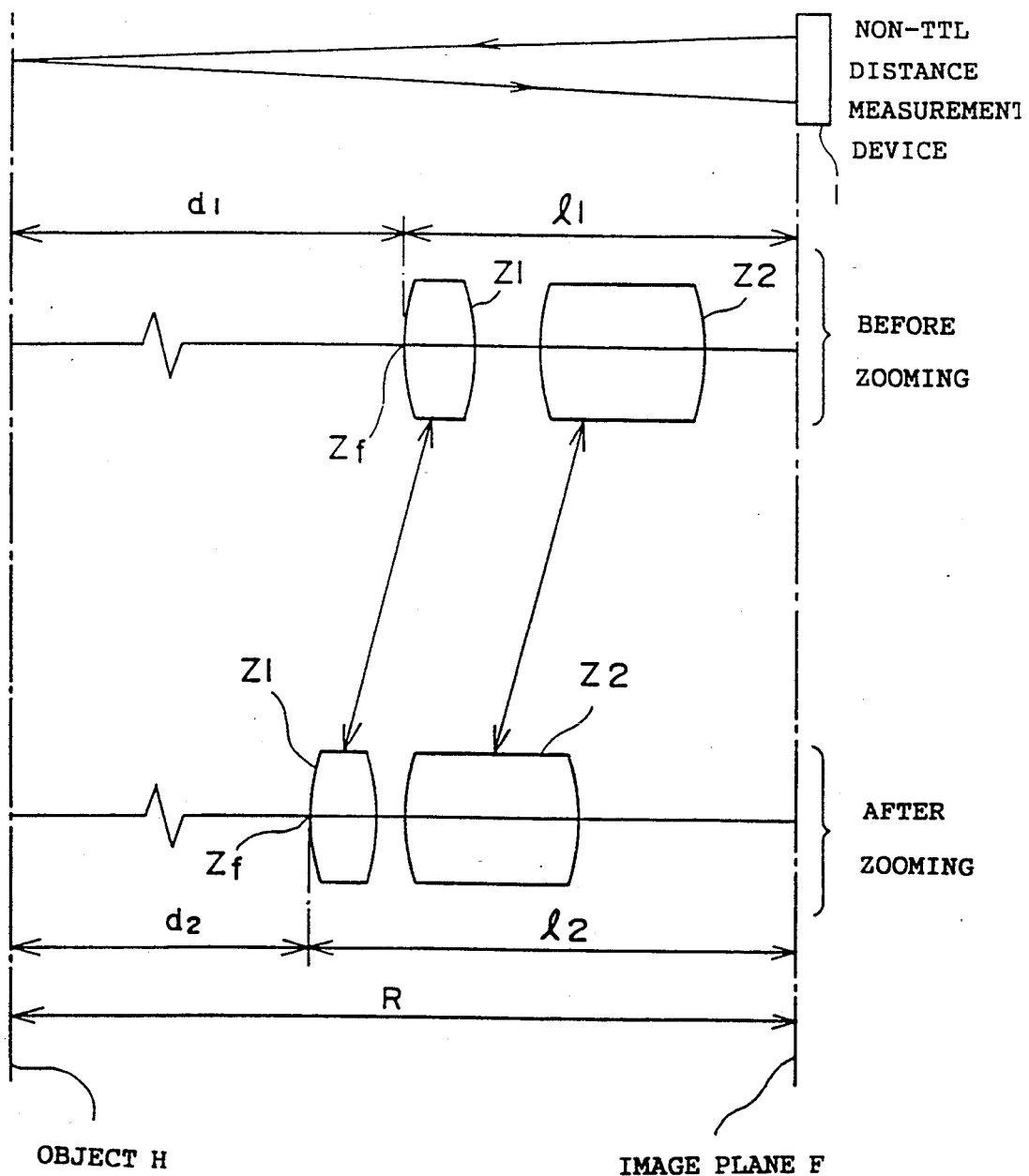
FIG. 7 is a figure for showing the situation before and after zooming the zoom lens.
Figure 8:
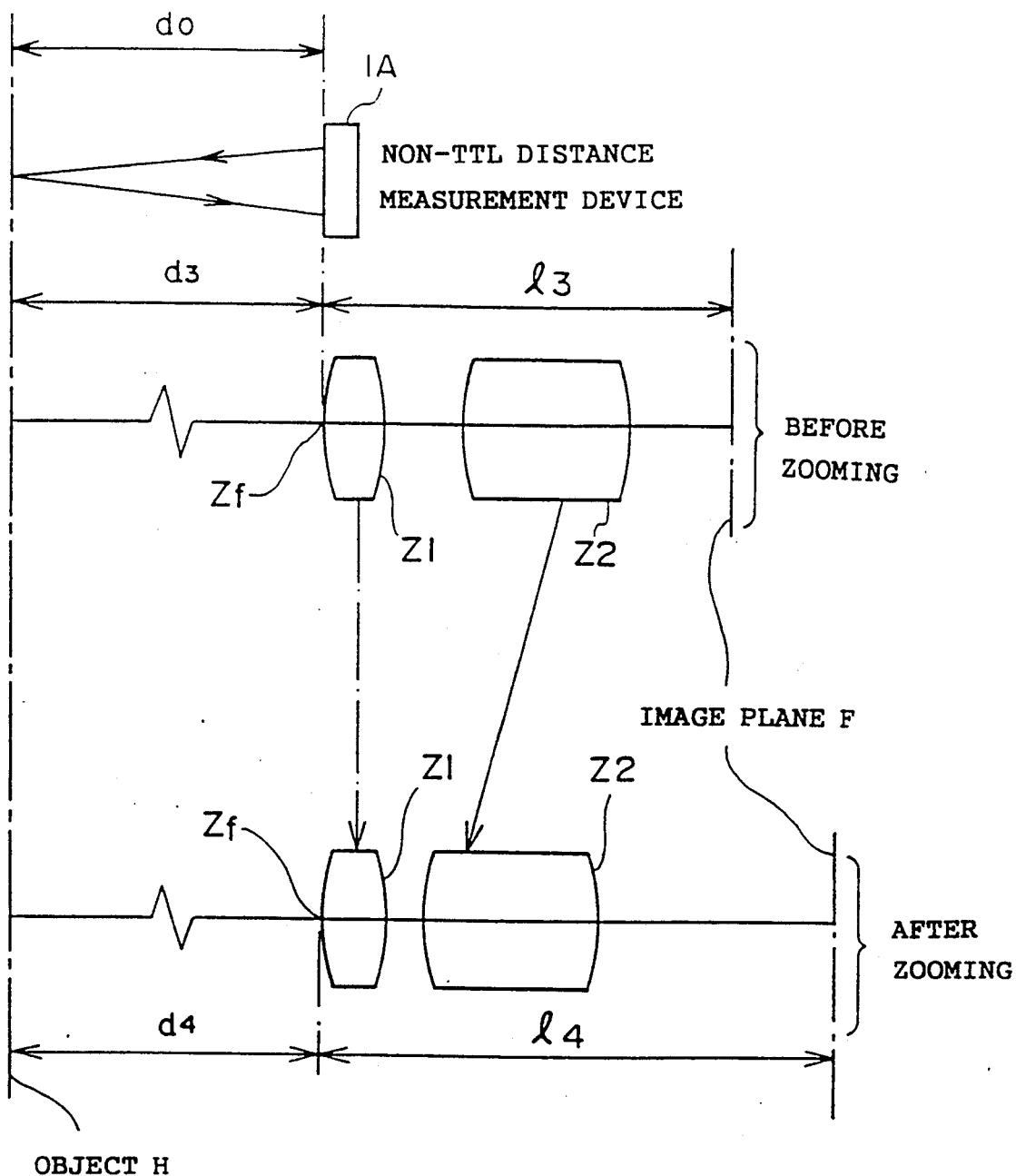
FIG. 8 is a figure for explaining an example of, when zooming, moving a focusing lens group as one unit together with a non-TTL distance measurement device.

FIG. 2 is a block diagram in which the general construction of the first embodiment of the camera of the present invention is shown. As diagrammatically shown in this figure, within a main body of the camera schematically shown by an enclosing box denoted by the reference numeral 10 there is housed a zoom lens 11, and this zoom lens 11, as shown in FIG. 7 which is a figure for explanation of the situation before and after zooming said zoom lens 11, is provided with a first lens group $Z_1$, positioned at the end of said zoom lens 11 closest to the object H (the outer end of said zoom lens 11 relative to the camera body 10), which can be moved to and fro in its axial direction relative to the remainder of said zoom lens 11 so as to be used as a focusing lens group for performing focus adjustment. In the main body 10 of the camera there is housed a control circuit 12 which includes a microcomputer and its associated circuitry (none of which is particularly shown), and, along with controlling the overall sequencing of the operation of this camera as well as performing various calculations, this control circuit 12 executes a control program which will be described hereinafter, so as to calculate the amount by which the first lens group $Z_1$ should be projected, and so as to control the actual movement of said first lens group $Z_1$ so as to project it to its thus calculated appropriate position.

To this control circuit 12 there are connected a distance measurement device 13, a photometric device 14, a focal length detection device 15, and a first stroke switch 16 and a second stroke switch 17. The distance measurement device 13 is of a non-TTL type and may be preferably include the active autofocus device or the passive autofocus device or the like, and said distance measurement device 13 detects the photographic distance R from the object H to the image plane F of the zoom lens 11 (the plane of the photographic film). The photometric device 14 performs photometry of the object field and detects the luminance of the object, while the focal length detection device 15 detects the focal length f of the zoom lens 11 as a whole; preferably, said focal length detection device 15 may do this by calculating the focal length f of the zoom lens 11 from the position of said zoom lens 11, said position being detected by the use of an encoder, for example. Further, the first stroke switch 16 transmits a first stroke signal to the control circuit 12 when it is turned ON by first stroke operation of a shutter release button not shown in the figures, while the second stroke switch 17 transmits a second stroke signal to the control circuit 12 when it is turned ON by second stroke operation of the same shutter release button.

To the control circuit 12, furthermore, there are connected a lens driving device 18 which includes a focusing motor not shown in the figures, and a shutter device 19. The lens driving device 18, according to the required amount Δ of projection calculated by the control circuit 12, moves the first lens group $Z_1$ of the zoom lens 11 relative to the remainder of said zoom lens 11 by operating the aforementioned focusing motor which is not particularly shown, thus performing focus adjustment for the zoom lens 11 as a whole. Further, the shutter device 19 performs exposure of a photographic film which is disposed in the image plane F but which is not shown in the figures, according to a release signal which it receives from the control circuit 12.

Figure 3:
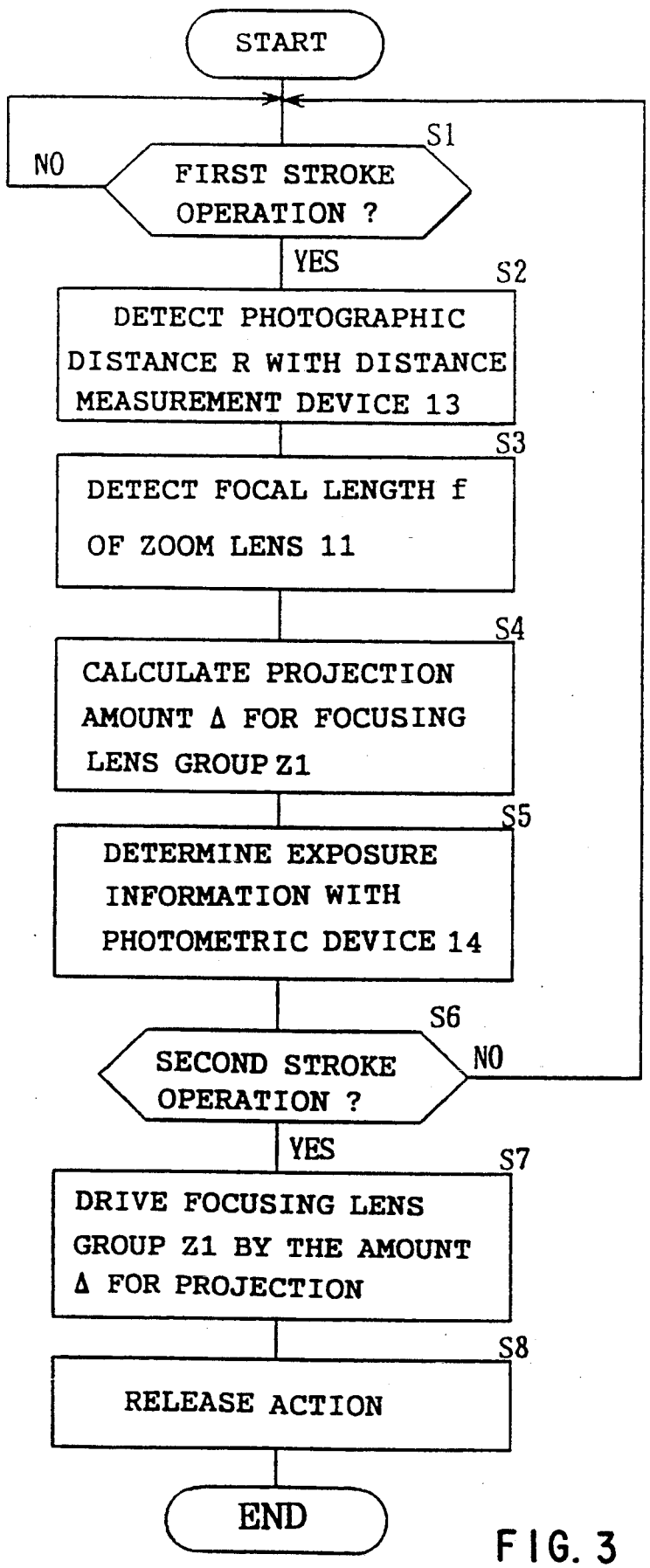
FIG. 3 is a flow chart of an exemplary control program for execution by a microcomputer incorporated in the first embodiment of the camera of the present invention.

FIG. 3 is a flow chart of the control program which is executed by the control circuit 12. The operation of the first embodiment of the present invention will now be explained with reference to this flow chart.

When a power switch which is not shown in the figures is turned ON, this control circuit 12 starts to obey this control program shown in FIG. 3. In the step S1 after the start of execution, a decision is made as to whether or not the shutter release button (not shown) is being first stroke operated, based upon whether the signal from the first stroke switch 16 is ON or OFF, and if the result of this decision is YES then the flow proceeds next to the step S2, while if the result of this decision is NO then the flow of control loops round to this first decision step S1 again. In the step S2, the photographic distance R is measured by the distance measurement device 13, and the flow of control proceeds to the next step S3, in which the focal length f of the zoom lens 11 as a whole is detected by the focal length detection device 15. Next, in the next step S4, based upon the photographic distance R and upon the focal length f of the zoom lens 11 as detected in the above steps S2 and S3, the projection amount Δ for the first lens group $Z_1$ of the zoom lens 11 is calculated according to the equation (6) described above. The equation (6) is the general equation, and the concrete manner in which this value is calculated in practice will be explained shortly.

Next, in the next step S5, the luminance of the object is detected by the photometric device 14, and then in the next step S6 a decision is made as to whether or not the shutter release button is being second stroke operated, based upon whether the signal from the second stroke switch 17 is ON or OFF. If in fact the shutter release button is being second stroke operated, then the flow proceeds next to the step S7, while otherwise the flow returns back to the step S1 again, to loop around. In the step S7, the first lens group $Z_1$ of the zoom lens 11 is moved by the lens driving device 18 so as to project by exactly the amount Δ, so that the object is focused upon accurately. Next in the next step S8 the shutter device 19 is controlled so as to be released, so that the photograph is taken, and then the execution of this program terminates.

Now, an example of a concrete set of steps by which the projection amount Δ for the first lens group $Z_1$ of the zoom lens 11 described above may be calculated in practice will be explained.

Figure 4:
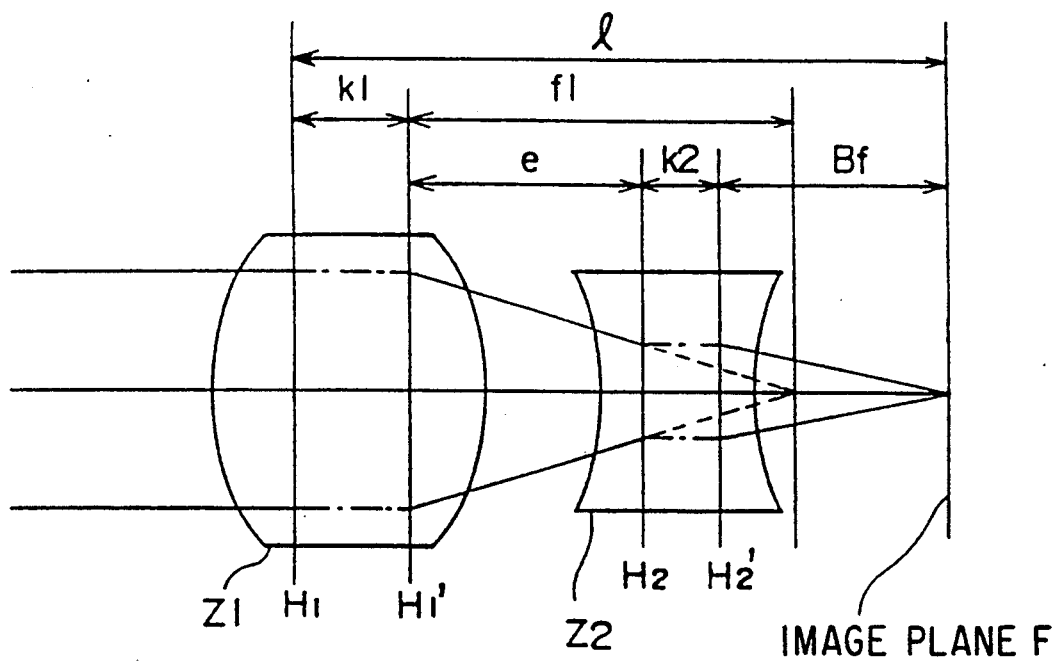
FIG. 4 is a figure for explaining a method of calculation for the projection amount for a focusing lens group for a zoom lens, in order to focus the zoom lens, according to the present invention.

FIG. 4 shows a zoom lens which is made up from a positive focal length lens group (the first lens group $Z_1$) and a negative focal length lens group (the second lens group $Z_2$). Referring to this figure, the focal length of a first lens group $Z_1$ which is a focusing lens group will be termed $f_1$; the focal length of a second lens group $Z_2$ will be termed $f_2$; the front side principal point of the first lens group $Z_1$ will be termed $H_1$; the rear side principal point of said first lens group $Z_1$ will be termed $H_1'$; the front side principal point of the second lens group $Z_2$ will be termed $H_2$; and the rear side principal point of said second lens group $Z_2$ will be termed $H_2'$. Further, the distance from the rear side principal point $H_1'$ of the first lens group $Z_1$ to the front side principal point $H_2$ of the second lens group $Z_2$ will be termed the group interval e, and the distance from the front side principal point $H_1$ of the first lens group $Z_1$ to the image plane F will be termed the zoom lens overall length l. Although the zoom lens overall length has been defined in the above description as the distance from the end point of the first lens group $Z_1$ in the direction of the object H to the image plane F, nevertheless, in the following description, the zoom lens overall length l will be defined as the distance from the front side principal point $H_1$ of the first lens group $Z_1$ to the image plane F, except indicated specially. This definition would cause no problem, because in the first lens group $Z_1$ the distance from its end point in the direction of the object H to its front side principal point $H_1$ is a fixed value characteristic of this lens group.

Further, if the distance from the rear side principal point $H_2'$ of the second lens group $Z_2$ to the image plane F is termed the back focal distance $B_f$, and the focal length of the zoom lens as a whole is termed f, then the group interval e is determined by the equation:

$$e = f_1 \cdot f_2 \cdot \left( \frac{1}{f_1} + \frac{1}{f_2} - \frac{1}{f} \right) \quad (7)$$

and the back focal distance $B_f$ is determined by the equation:

$$B_f = f - \frac{f}{f_1} e \quad (8)$$

Further, the zoom lens overall length l is determined by the equation:

$$l = k_1 + e + k_2 + B_f \quad (9)$$

Here, $k_1$ is the distance between the principal points of the first lens group $Z_1$, and $k_2$ is the distance between the principal points of the second lens group $Z_2$.

Substituting equations (7) and (8) into equation (9), the zoom lens overall length l is determined by the equation:

$$l = -\frac{f_2}{f_1} f + (2f_2 + f_1 + k_1 + k_2) - f_1 \cdot f_2 \cdot \frac{1}{f} \quad (10)$$

Here, if we put:

$$-\frac{f_2}{f_1} = J$$

$$2f_2 + f_1 + k_1 + k_2 = K$$

$$-f_1 \cdot f_2 = L$$

then the values J, K, and L are characteristic constants for each zoom lens, and according to this the zoom lens overall length l is given by:

$$l = J \cdot f + K + L \frac{1}{f} \quad (11)$$

Further, as described above, the distance d between the first lens group $Z_1$ and the object H is determined as the photographic distance R with the zoom lens overall length l subtracted from it (i.e., d=R−l), so that, substituting into equation (2), the projection amount Δ is given by the equation:

$$\Delta = \frac{f_1^2}{R - l - f_1} \quad (12)$$

Because R is much greater than (l+$f_1$), as a second order approximation this can be reduced to the equation:

$$\Delta \approx f_1^2 \left( \frac{1}{R} + \frac{l + f_1}{R^2} \right) \quad (13)$$

According to the equations (11) and (13), the projection amount Δ is given by the following equation:

$$\Delta = \frac{f_1^2}{R} + \frac{f_1^2 \left( J \cdot f + K + f_1 + L \frac{1}{f} \right)}{R^2} \quad (14)$$

Equation (14) is stored in a ROM or the like of the control circuit 12, and, based upon the photographic distance R measured by the distance measurement device 13 and the focal length f of the zoom lens 11 as detected by the focal length detection device 15, by substitution into equation (14), the projection amount Δ for the first lens group $Z_1$ which is the focusing lens group is calculated. Because as described above the constants J, K, and L are values specific for and characteristic of each individual zoom lens, and are constant for each such lens, therefore the equation (14) is preferably recorded by substituting for them the specific values for the actual zoom lens 11 fitted to the camera in question. As an alternative to the above construction and operation, it would also be acceptable for the focal length f of the zoom lens to be detected from the drive amount of the drive motor (not particularly shown) which is used for zooming the zoom lens 11.

Further, the calculated projection amount Δ is converted into a driving pulse amount for the focusing motor (not particularly shown), and is output to the lens driving device 18 as a drive signal for that focusing motor. The lens driving device 18 drives the focusing motor by just this drive pulse amount, so as to move the first lens group $Z_1$ to its appropriately projected position, and thereby a clear image of the object is focused upon the image plane F.

Further, with the zoom lens shown in FIG. 4 which is made up from a positive focal length lens group (the first lens group $Z_1$) and a negative focal length lens group (the second lens group $Z_2$), in the case that the first lens group $Z_1$ is comprised of a front lens group which is positioned on the side of the first lens group towards the object and a rear lens group which is positioned on the side of the first lens group towards the image plane, and that the front lens group performs focusing by projecting this front lens group only (such as the one disclosed in U.S. Pat. No. 4,911,539), then it is also possible to calculate the projection amount Δ in the following manner. If the focal length of the front lens group in the first lens group $Z_1$ is termed $f_F$, then, by substituting into the equation (12) above:

$$\Delta = \frac{f_F^2}{R - l - f_F} \quad (15)$$

and by substituting into the equation (14) above:

$$\Delta = \frac{f_F^2}{R} + \frac{f_F^2 \left( J \cdot f + K + f_F + L \frac{1}{f} \right)}{R^2} \quad (16)$$

As described above according to this first embodiment of the present invention, i.e. by detecting the photographic distance R and the focal length f of the zoom lens 11, by calculating the projection amount Δ for the focusing lens group $Z_1$ of the zoom lens 11 based upon these detected values, and by then moving the focusing lens group $Z_1$ so as to cause it to project by just this appropriate projection amount Δ, it is possible to compensate for focus deviation when zooming the zoom lens. By this, focus deviation of the zoom lens during zooming caused by the increase in magnification ratio and the shortening of the closest photographic distance can be appropriately compensated for, and it becomes possible to apply a zoom lens which has high magnification ratio and/or short closest photographic distance.

Figure 9:
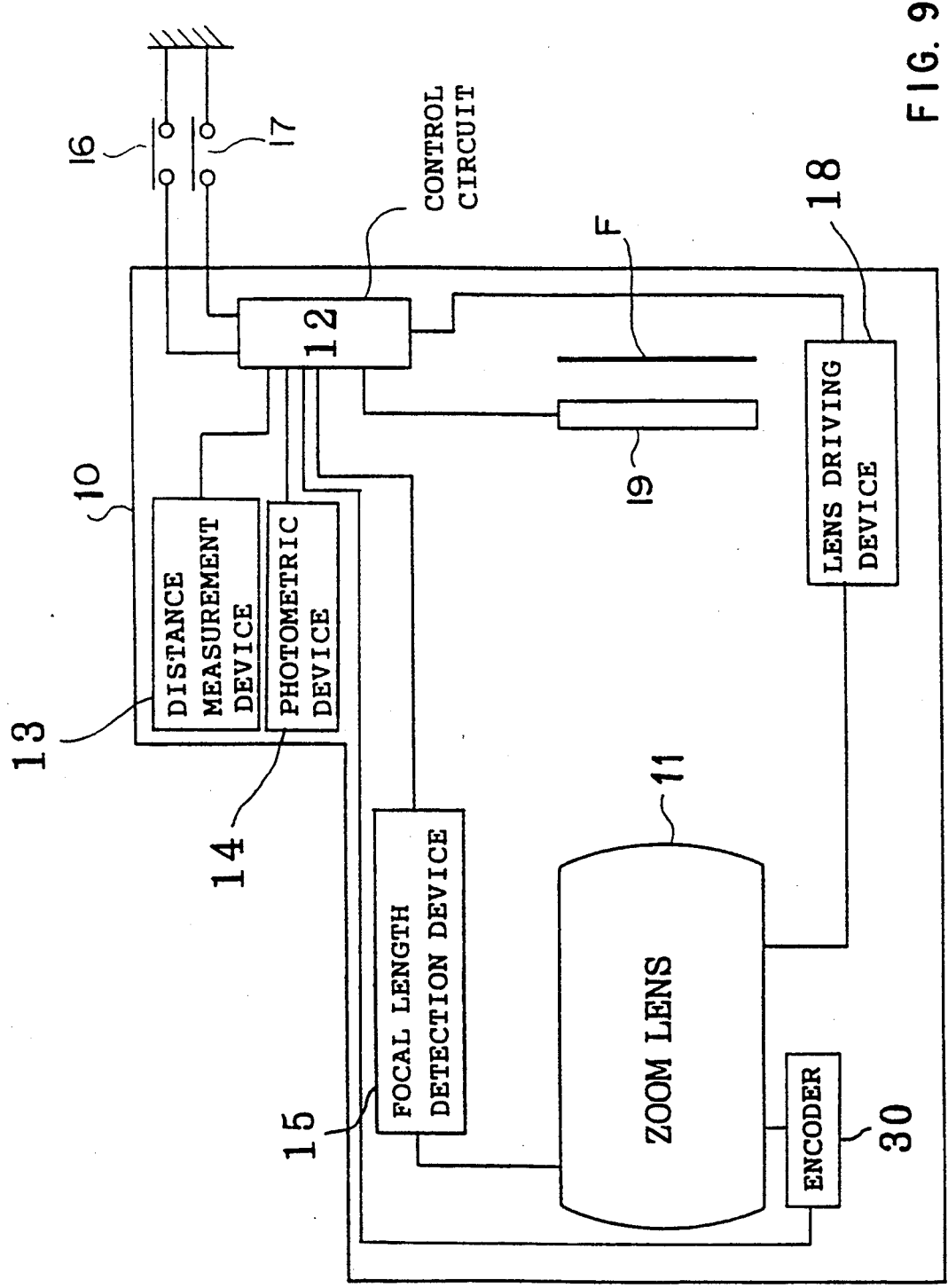
FIG. 9 is a block diagram showing the variation for the first embodiment of the camera of the present invention.

Although in the above described first embodiment, as an example, there was disclosed a method by which the photographic distance R and the focal length f of the zoom lens were detected, and the projection amount Δ for the focusing lens group $Z_1$ was calculated according to equation (6) (in practice according to equation (14), etc.), as an alternative it would also be acceptable to detect, instead of the focal length f, the distance to the image plane F from the end of the zoom lens 11 in the direction towards the object, i.e the overall length l of the zoom lens 11, and to calculate the projection amount Δ for the focusing lens group $Z_1$ according to equation (4) (in practice according to equations (12), (13), etc.), based upon this overall length l and upon the photographic distance R. In such a case, this overall length l may satisfactorily be detected by providing the zoom lens 11 with an encoder 30 or the like, as shown in FIG. 9, so that, by detecting the amount of movement of the focusing lens group $Z_1$ when zooming, said overall length l may be obtained.

Second Embodiment

Next, a second embodiment of the present invention will be explained, in which the present invention is applied to a compact autofocus camera the lens of which can be changed over between a zoom lens and a normal photographic lens (i.e. a lens with a fixed focal length).

Figure 5:
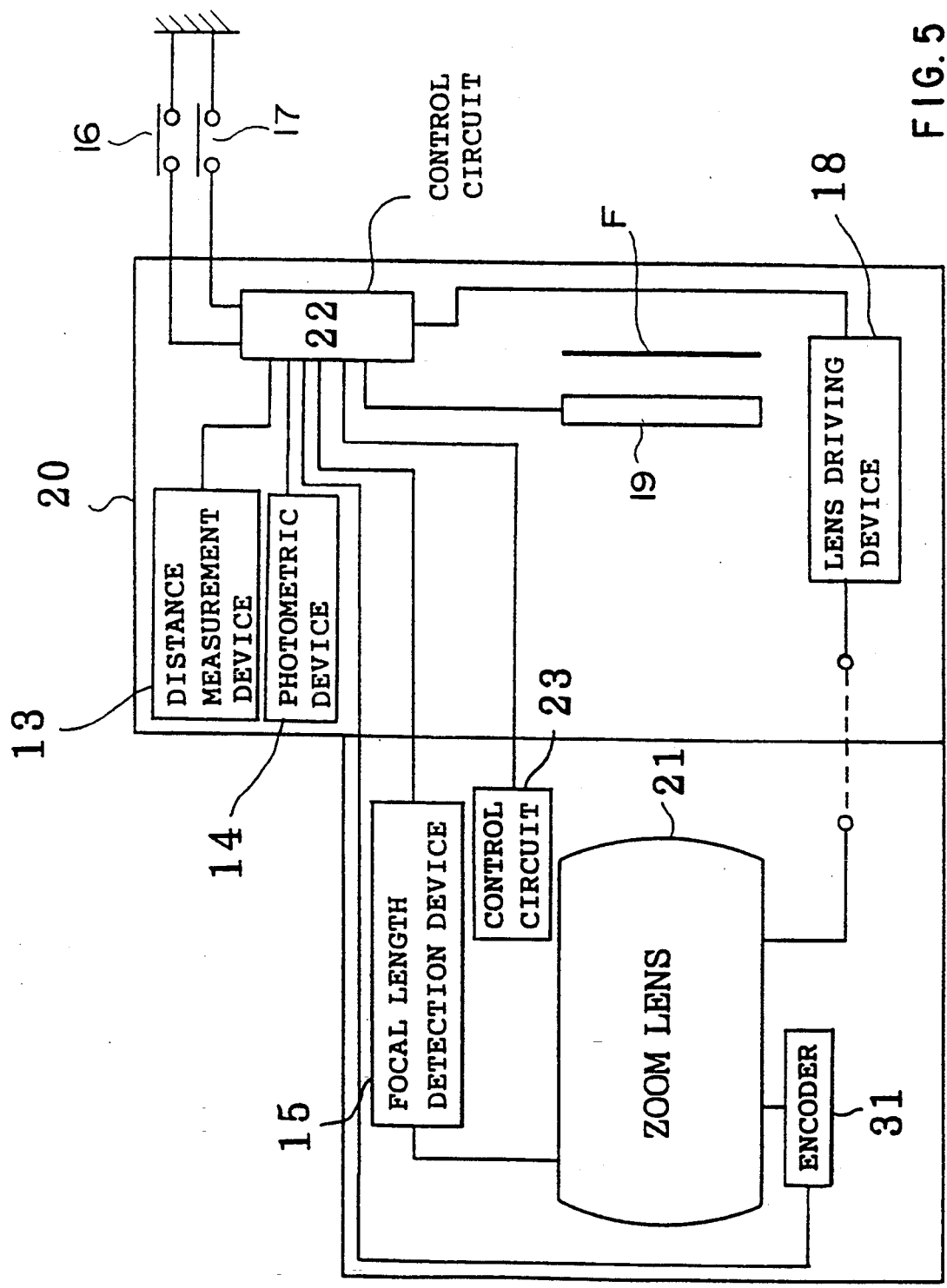
FIG. 5 is a block diagram showing the general construction of the second embodiment of the camera of the present invention.

FIG. 5 shows the general construction of the second embodiment of the camera of the present invention. Parts of this second embodiment which correspond to parts of the first embodiment shown in FIG. 2 will be referred to in FIG. 5 by the same reference numerals as were used in FIG. 2 for the corresponding parts, and the description thereof will be curtailed; so that the following explanation will chiefly relate to the points of difference between the first embodiment described above and the second embodiment.

To a main body 20 of the camera there is removably mounted a zoom lens 21, and this zoom lens 21, as shown in FIG. 7, is provided with a first lens group $Z_1$ which is a focusing lens group for performing focus adjustment and is positioned at the end of said zoom lens 21 closest to the object H. In the main body 20 of the camera there is housed a control circuit 22 which is made up from a microcomputer and its associated circuitry (none of which is particularly shown), and this control circuit 22, by executing a control program which will be described hereinafter, along with controlling the overall sequencing of the operation of this camera as well as performing various calculations, also calculates the amount by which the first lens group $Z_1$ should be projected, and controls the movement of said first lens group $Z_1$ so as to project it to its thus calculated appropriate position. And, further, a control circuit 23 including a microcomputer is provided internally to the zoom lens 21, and this microcomputer stores previously recorded information relating to the lens and when required transmits this information to the control circuit 22 in the camera main body 20.

Among the information which is stored in the control circuit 23, there is included information I as to whether or not this zoom lens is one to which the present invention is relevant; that is to say, as to whether or not this zoom lens is one which includes a focusing lens group for performing focus adjustment which is positioned at the end of this zoom lens closest to the object H, and as to whether this zoom lens is a zoom lens for which the distance from the focusing lens group to the image plane F, that is, the overall length of the zoom lens, should be varied during zooming.

The control circuit 22 in the main body 20 of the camera, when the zoom lens 21 is fitted to said camera main body 20, inputs the information I from the control circuit 23 which is fitted in said zoom lens 21, and makes a decision as to whether this zoom lens 21 is one to which the present invention is relevant. If the answer to this decision is YES, then the projection amount $\Delta$ for the focusing lens group is calculated based upon the photographic distance R and the focal length f of the zoom lens 21 as a whole, according to the above described equation (6) (in practice according to equation (14) etc.); while on the other hand, if this is a lens to which the present invention is not relevant, then the projection amount $\Delta'$ for the focusing lens group is calculated based upon the photographic distance R, i.e. is calculated in the same manner as in the case of a conventional compact camera; since this method of calculation of the projection amount $\Delta'$ is per se known, the description thereof will be curtailed in the interests of brevity. The decision that the zoom lens 21 is one to which the present invention is not relevant means that a zoom lens the overall length of which is fixed even if the zoom lens is zoomed is mounted to the main body 20 of the camera.

Figure 6:
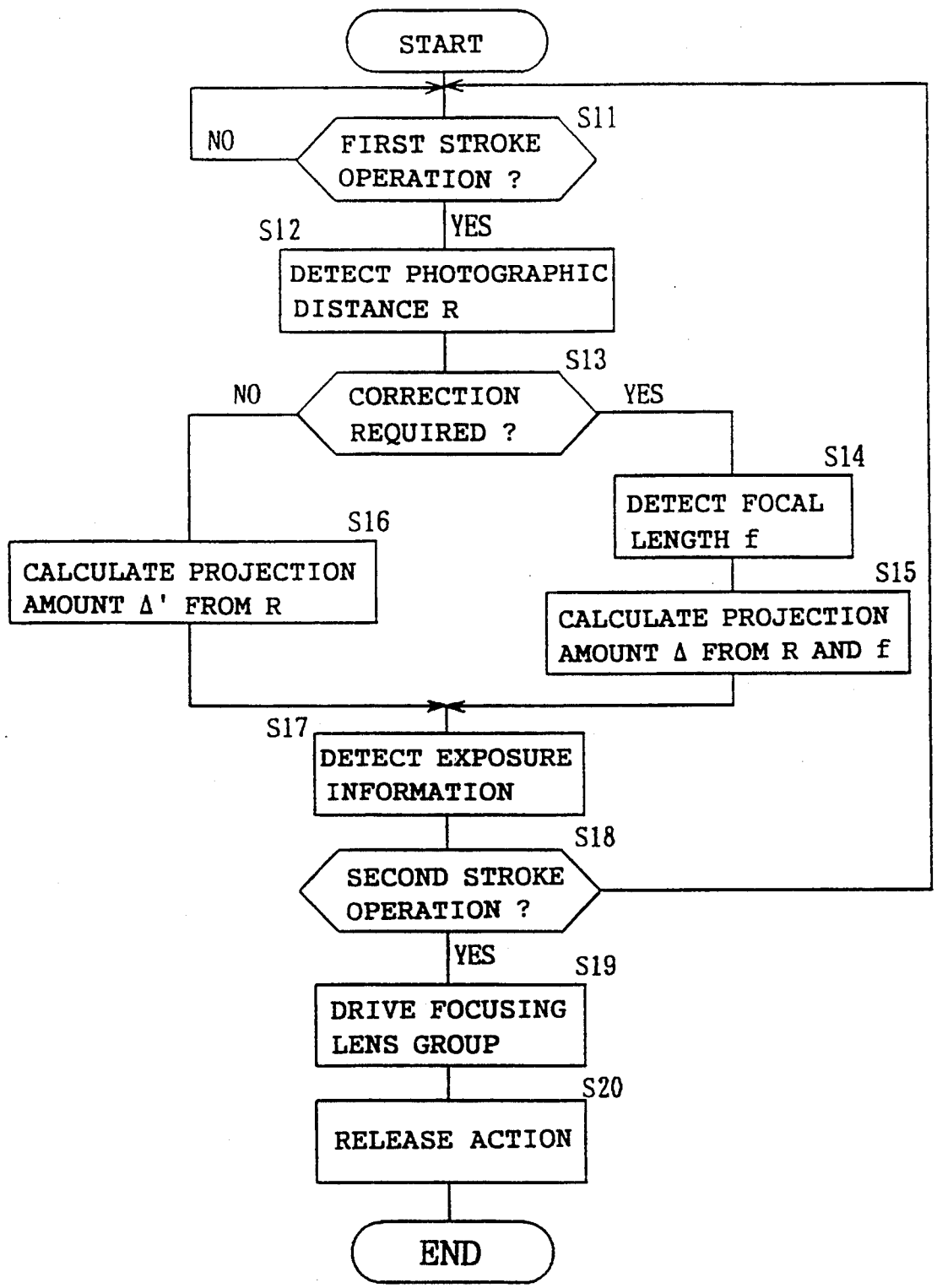
FIG. 6 is a flow chart of an exemplary control program for execution by a microcomputer incorporated in the second embodiment of the camera of the present invention.

FIG. 6 is a flow chart of the control program which is executed by the control circuit 22. The operation of the second embodiment of the present invention will now be explained with reference to this flow chart.

When a power switch which is not shown in the figures is turned ON, the control circuit 22 starts to obey this control program. In the step S11 after the start of program execution, a decision is made as to whether or not the shutter release button (not shown) is being first stroke operated, based upon whether the signal from the switch 16 is ON or OFF, and if the result of this decision is YES then the flow proceeds next to the step S12, while if the result of this decision is NO then the flow loops back to return to this step S11 again. In the next step S12, the photographic distance R is measured by the non-TTL distance measurement device 13, and next in the next decision step S13 a decision is made in the manner described above as to whether this zoom lens 21 currently fitted to the camera body 20 is one to which the present invention is relevant, and as to whether or not a correction is required for focus deviation during zooming. If a YES decision is made, i.e. if it is decided that this zoom lens 21 is in fact one to which the present invention is relevant and that focus deviation correction is required, then the flow proceeds next to the step S14, while if a NO decision is made then the flow proceeds next to the step S16.

In the step S14, the focal length f of the zoom lens 21 as a whole is detected by the focal length detection device 15, and next, in the next step S15, based upon the photographic distance R and upon the focal length f of the zoom lens 21, the amount $\Delta$ of projection for the first focusing lens group $Z_1$ of the zoom lens 21 is calculated according to equation (6) described above (in practice, however, according to equation (14) etc.). Alternatively, it would be possible to detect the focal length f of the zoom lens 21 according to the drive amount of the drive motor (not particularly shown) used for zooming the zoom lens 21. Next, in the next step S17, the luminance of the object is detected by the photometric device 14, and the flow proceeds to the next decision step S18. On the other hand, in the step S16, because in this case it has been decided in the decision step S13 that the zoom lens 21 is not one to which the present invention is relevant, the projection amount $\Delta'$ for the first focusing lens group $Z_1$ is calculated based upon the photographic distance R, only, i.e. is calculated using a method which is per se known in a conventional compact camera, and then the flow proceeds next to the step S17. In this step S17, the luminance of the object is detected by the photometric device 14, and then the flow proceeds to the next decision step S18.

In this step S18, a decision is made as to whether or not the shutter release button (not shown) is being second stroke operated, based upon whether the signal from the switch 17 is ON or OFF. If in fact the shutter release button is being second stroke operated, then the flow proceeds next to the step S19, while otherwise the flow loops back so as to return to the step S11 again. In the step S19, the first lens group $Z_1$ of the zoom lens 21 is moved by the lens driving device 18 to exactly the amount $\Delta$ or $\Delta'$ as the case may be (according to the result of the decision in the decision step S13—$\Delta$ if this decision was YES, $\Delta'$ if this decision was NO), so that the object is focused upon. Next in the next step S20 the shutter device 19 is controlled so as to be released, and then the execution of this program terminates.

According to the second embodiment of the present invention as described above, the photographic distance R and the focal length f of the zoom lens 21 are detected, and based upon the values found for these quantities the projection amount $\Delta$ for the focusing lens group $Z_1$ of the zoom lens 21 is calculated, and then the focusing lens group $Z_1$ is moved to just this projection amount $\Delta$, so that the focus deviation amount during zooming is corrected for In this manner, it is possible appropriately to correct the focus deviation in a zoom lens during zooming caused by the increase in magnification ratio and the shortening of the closest photographic distance, and thus it is possible to apply a zoom lens of high magnification ratio and/or short closest photographic distance.

Figure 10:
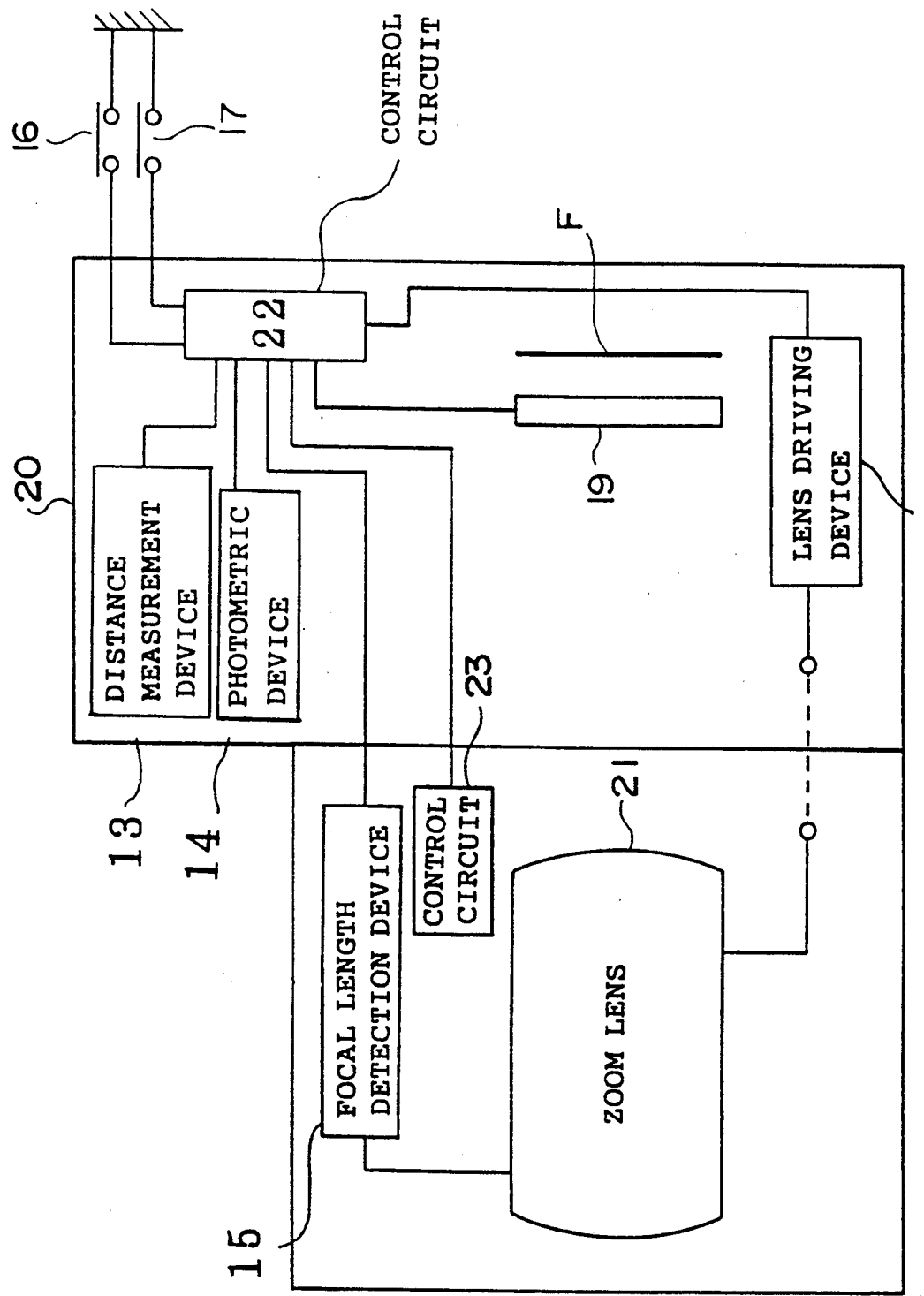
FIG. 10 is a block diagram showing the variation for the second embodiment of the camera of the present invention.

With the above described second embodiment, although as an example the case was shown in which the photographic distance R and the focal length f of the zoom lens 21 were detected, and based upon the values found for these quantities the projection amount $\Delta$ for the focusing lens group $Z_1$ as calculated according to the equation (6) (actually in practice according to the equation (14) etc.), it would also be acceptable, as an alternative, to detect, instead of the focal length f, the distance from the end of the zoom lens 21 in the direction towards the object to the image plane F, i.e the overall length l of the zoom lens 21, and to calculate the projection amount $\Delta$ for the focusing lens group $Z_1$ based upon this overall length l and the photographic distance R, according to the equation (4) (actually in practice according to the equations (12), (13), etc.). In such a case, an encoder 31 or the like may desirably be provided for detecting the overall length of the zoom lens 21 as shown in FIG. 10, so that by measuring the amount of movement of the focusing lens group $Z_1$ when zooming, said overall length l may be obtained.

Further, although as an example in the case of embodiments as described above a zoom lens was used in which the focusing lens group was disposed at the extreme end of the zoom lens 21 in the direction towards the object, as an alternative it would also be possible for the present invention to be applied to a so called internal focusing type zoom lens, in which the focusing lens group is disposed internally to the zoom lens assembly and is moved during zooming.

The present invention has been shown and described in terms of several preferred embodiments thereof, but is not to be considered as limited by any of the perhaps quite fortuitous details of said embodiments or of the drawings, but only by the terms of the appended claims, which follow.

What is claimed is:

1. A photographic camera with variable focal length having a zoom lens provided with a focusing lens group disposed at an end of the zoom lens closest to an object to be photographed for performing focus adjustment, and a camera main body being provided with said zoom lens, a distance from said focusing lens group to an image plane being varied during zooming of said zoom lens, comprising:
    a distance measurement means for detecting a photographic distance from said object to be photographed to said image plane;
    a parameter detection means for detecting a parameter representative of a focal length of said zoom lens, said representative parameter varying in accordance with the zooming of said zoom lens;
    a calculation means for calculating an amount of movement for said focusing lens group, based upon said photographic distance and said representative parameter; and
    a lens driving means for moving said focusing lens group according to said movement amount.

2. A photographic camera with variable focal length having a zoom lens provided with a focusing lens group disposed at an end of the zoom lens closest to an object to be photographed for performing focus adjustment, and a camera main body being provided with said zoom lens, a distance from said focusing lens group to an image plane being varied during zooming of said zoom lens, comprising:
    a distance measurement means for detecting a photographic distance from said object to be photographed to said image plane;
    a focal length detection means for detecting the focal length of said zoom lens;
    a calculation means for calculating an amount of movement for said focusing lens group, based upon said photographic distance and said focal length; and
    a lens driving means for moving said focusing lens group according to said movement amount.

3. A camera according to claim 2, wherein said distance measurement means includes a non-TTL distance detection device which has an optical system separate from said zoom lens.

4. A camera according to claim 2, wherein:
    said zoom lens includes a first lens group, having a focal length which serves as said focusing lens group, and which is disposed closest to said object to be photographed; and
    said calculation means calculates the amount of movement Δ for said first lens group using the following equation:

$$\Delta = \frac{f_1^2}{R} + \frac{f_1^2 \left( J \cdot f + K + f_1 + L\frac{1}{f} \right)}{R^2}$$

in which R denotes the photographic distance detected by said distance measurement means, f denotes the focal length detected by said focal length detection means, $f_1$ denotes the focal length of said first lens group, and L, J, and K denote constant values characteristic of said zoom lens.

5. A camera according to claim 4, wherein said zoom lens further includes a second lens group which is disposed on a side of said first lens group towards said image plane.

6. A camera according to claim 2, wherein:
    said zoom lens includes a first lens group which is disposed closest to said object to be photographed, and which is moved as a unit during zooming of said zoom lens;
    said first lens group includes a front group having a focal length, disposed on a side of said first lens group toward said object to be photographed, which serves as said focusing lens group; and
    said calculation means calculates the amount of movement Δ for said front group using the following equation:

$$\Delta = \frac{f_F^2}{R} + \frac{f_F^2 \left( J \cdot f + K + f_F + L\frac{1}{f} \right)}{R^2}$$

in which R denotes the photographic distance detected by said distance measurement means, f denotes the focal length detected by said focal length detection means, $f_F$ denotes the focal length of said front group, and J, K, and L denote constant values characteristic of said zoom lens.

7. A camera according to claim 6, wherein said zoom lens includes a second lens group which is disposed on a side of said first lens group towards said image plane.

8. A camera according to claim 2, wherein said zoom lens is mountable to and demountable from said camera main body.

9. A camera according to claim 8, further comprising:
    a decision means for deciding whether said camera main body is fitted with a zoom lens in which, when zooming of said zoom lens, the distance to said image plane from said focusing lens group, which is disposed closest to said object to be photographed changes;
    and wherein when a decision is reached by said decision means that said camera main body is fitted with said zoom lens, said calculation means calculates the amount of movement for said focusing lens group based upon said detected photographic distance and upon said detected focal length;
    while, when a decision is reached by said decision means that said camera main body is not fitted with said zoom lens, said calculation means calculates the amount of movement for said focusing lens group based upon said detected photographic distance.

10. A photographic camera with variable focal length having a zoom lens provided with a focusing lens group disposed at an end of the zoom lens closest to an object to be photographed for performing focus adjustment, and a camera main body being provided with said zoom lens, a distance from said focusing lens group to an image plane being varied during zooming of said zoom lens, comprising:
- a distance measurement means for detecting a photographic distance from said object to be photographed to said image plane;
- a lens overall length detection means for detecting an overall length of said zoom lens, wherein the overall length of said zoom lens is a distance to said image plane from an end of said zoom lens, said end of said zoom lens being an end toward said object to be photographed;
- a calculation means for calculating an amount of movement for said focusing lens group, based upon said photographic distance and said overall length of said zoom lens; and
- a lens driving means for moving said focusing lens group according to said movement amount.

11. A camera according to claim 10, wherein said distance measurement means comprises a non-TTL distance detection device which has an optical system separate from said zoom lens.

12. A camera according to claim 10, wherein the overall length of said zoom lens is a distance to said image plane from a front side principal point of said focusing lens group, which is disposed closest to said object to be photographed.

13. A camera according to claim 12, wherein:
said zoom lens includes a first lens group, having a focal length disposed closest to said object to be photographed, which serves as said focusing lens group; and
said calculation means calculates the amount of movement Δ for said first lens group using the following equation:

$$\Delta = \frac{f_1^2}{R - l - f_1}$$

in which R denotes said photographic distance detected by said distance measurement means, l denotes the overall length of said zoom lens detected by said lens overall length detection means, and $f_1$ denotes the focal length of said first lens group.

14. A camera according to claim 12, wherein:
said zoom lens includes a first lens group, having a focal length disposed closest to said object to be photographed, which serves as said focusing lens group; and
said calculation means calculates the amount of movement Δ for said first lens group using the following equation:

$$\Delta = f_1^2 \left( \frac{1}{R} + \frac{l + f_1}{R^2} \right)$$

in which R denotes said photographic distance detected by said distance measurement means, l denotes the overall length of said zoom lens detected by said lens overall length detection means, and $f_1$ denotes the focal length of said first lens group.

15. A camera according to claim 10, wherein said zoom lens is mountable to and demountable from said camera main body.

16. A camera according to claim 15, further comprising:
a decision means for deciding whether said camera body is fitted with a zoom lens in which, when zooming of said zoom lens, the distance to said image plane from said focusing lens group, which is disposed closest to said object to be photographed changes;
and wherein when a decision is reached by said decision means that said camera main body is fitted with said zoom lens, said calculation means calculates the amount of movement for said focusing lens group based upon said detected photographic distance and upon said detected overall length of said zoom lens;
while, when a decision is reached by said decision means that said camera main body is not fitted with said zoom lens, said calculation means calculates the amount of movement for said focusing lens group based upon said detected photographic distance.

17. A camera according to claim 10, wherein said lens overall length detection means detects the overall length of said zoom lens in accordance with a position of said focusing lens group, along an optical axis of said zoom lens, relative to a remainder of said zoom lens.

18. A method for adjusting focus of a zoom lens of a photographic camera with variable focal length, the zoom lens being provided with a focusing lens group disposed at an end of the zoom lens closest to an object to be photographed for performing focus adjustment, a distance from said focusing lens group to an image plane being varied during zooming of said zoom lens, the method comprising the steps of:
detecting the photographic distance from said object to be photographed to said image plane with a distance measuring device of said camera;
detecting a parameter representative of a focal length to which said zoom lens is set with a parameter detecting device of said camera, said representative parameter varying in accordance with the zooming of said zoom lens;
calculating an amount of movement for said focusing lens group using a calculating device of said camera, based upon said photographic distance and said representative parameter; and
moving said focusing lens group according to said movement amount using a focusing lens group movement device that is coupled to said focusing lens group.

19. A method according to claim 18, wherein said step of detecting a parameter representative of a focal length includes detecting the focal length of the zoom lens.

20. A method according to claim 18, wherein said step of detecting a parameter representative of a focal length includes detecting an overall length of said zoom lens, wherein the overall length of said zoom lens is a distance to said image plane from an end of said zoom lens located closest to said object to be photographed.

21. A photographic camera with variable focal length having a zoom lens provided with a focusing lens group disposed at an end of the zoom lens closest to an object to be photographed for performing focus adjustment, and a camera main body being provided with said zoom lens, a distance from said focusing lens group to an image plane being varied during zooming of said zoom lens, comprising:

a distance measurement device that detects a photographic distance from said object to be photographed to said image plane;

a parameter detection device that detects a parameter representative of a focal length of said zoom lens, said representative parameter varying in accordance with the zooming of said zoom lens;

a calculation device, coupled to said distance measurement device and said parameter detection device, said calculation device calculating an amount of movement for said focusing lens group, based upon said photographic distance and said representative parameter; and a lens driving device, coupled to said focussing lens group and said calculation device, said lens driving device moving said focusing lens group according to said movement amount.

22. A camera according to claim 21, wherein said parameter detecting device detects the focal length of the zoom lens.

23. A camera according to claim 21 wherein said parameter detecting device detects an overall length of said zoom lens, wherein the overall length of said zoom lens is a distance to said image plane from an end of said zoom lens located closest to said object to be photographed.

24. A photographic camera with a variable focal length, comprising:

a camera main body;

a zoom lens attached to said camera main body and including a focusing lens group disposed at an end of the zoom lens closest to an object to be photographed, wherein a distance from said focusing lens group to an image plane of the camera is varied during zooming of said zoom lens;

a distance sensor that senses a photographic distance from said object to be photographed to said image plane;

a parameter sensor that senses a parameter representative of a focal length of said zoom lens, said representative parameter varying during zooming of said zoom lens;

a processor, coupled to said distance sensor and to said parameter sensor, said processor calculating an amount of movement of said focusing lens group necessary to focus the camera, based upon said sensed photographic distance and said sensed representative parameter; and a lens driving motor, coupled to said processor and to said focusing lens group, said lens driving motor moving said focusing lens group, according to said calculated amount of movement.

25. A photographic camera with a variable focal length, comprising:

a camera main body;

a zoom lens attached to the camera main body, the zoom lens including a focusing lens group disposed at an end of the zoom lens closest to an object to be photographed, a distance from said focusing lens group to an image plane being varied during zooming of said zoom lens;

a distance sensor that senses a photographic distance from an object to be photographed to said image plane;

a focal length sensor that senses a focal length of said zoom lens;

a processor, coupled to said distance sensor and to said focal length sensor, said processor calculating an amount of movement of said focusing lens group necessary to focus the camera, based upon said sensed photographic distance and said sensed focal length; and a lens driving motor coupled to said processor and to said focusing lens group, said lens driving motor moving said focusing lens group according to said calculated amount of movement.

26. A camera according to claim 25, wherein:

said focusing lens group has a focal length and wherein said processor calculates the amount of movement $\Delta$ for said focusing lens group necessary to focus the camera using the following equation:

$$\Delta = \frac{f_1^2}{R} + \frac{f_1^2\left(J \cdot f + K + f_1 + L\frac{1}{f}\right)}{R^2}$$

in which R denotes the photographic distance sensed by said distance sensor, f denotes the focal length sensed by said focal length sensor, $f_1$ denotes the focal length of said focusing lens group, and L, J and K denote constant values characteristic of said zoom lens.

27. A camera according to claim 25, wherein:

said focusing lens group is moved as a unit during zooming of said zoom lens, and wherein said focusing lens group includes a front group having a focal length, said front group being disposed on a side of said focusing lens group towards an object to be photographed, and wherein said processor calculates an amount of movement $\Delta$ for said front group necessary to focus the camera using the following equation:

$$\Delta = \frac{f_F^2}{R} + \frac{f_F^2\left(J \cdot f + K + f_F + L\frac{1}{f}\right)}{R^2}$$

in which R denotes the photographic distance detected by said distance sensor, f denotes the focal length detected by said focal length sensor, $f_F$ denotes the focal length of said front group, and J, K, and L denote constant values characteristic of said zoom lens.

28. A photographic camera with a variable focal length, comprising:

a camera main body;

a zoom lens attached to said camera main body, the zoom lens including a focusing lens group disposed at an end of the zoom lens closest to an object to be photographed, a distance from said focusing lens group to an image plane of the camera being varied during zooming of said zoom lens;

a distance sensor that senses a photographic distance from said object to be photographed to said image plane;

a lens length sensor that senses an overall length of said zoom lens, wherein the overall length of said zoom lens is a distance to said image plane from an end of said zoom lens closest to said object to be photographed;

a processor, coupled to said distance sensor and to said lens length sensor, said processor calculating an amount of movement of said focusing lens group necessary to focus the camera, based upon said sensed photographic distance and said sensed overall length of said zoom lens; and a lens driving motor, coupled to said processor and to said focusing lens group, said lens driving motor moving said focusing lens group according to said calculated movement amount.

29. A camera according to claim 28, wherein the overall length of said zoom lens is a distance from a front side principal point of said focusing lens group to said image plane, said focusing lens group has a focal length, and wherein said processor calculates the amount of movement $\Delta$ of said focusing lens group necessary to focus the camera using the following equation:

$$\Delta = f_1^2 \left( \frac{1}{R} + \frac{l + f_1}{R^2} \right)$$

in which R denotes said photographic distance sensed by said distance sensor, l denotes the overall length of said zoom lens, and $f_1$ denotes the focal length of said focusing lens group.

30. A camera according to claim 28, wherein the overall length of said zoom lens is a distance from a front side principal point of said focusing lens group to said image plane, said focusing lens group has a focal length, and wherein said processor calculates the amount of movement $\Delta$ of said focusing lens group necessary to focus the camera using the following equation:

$$\Delta = \frac{f_1^2}{R - l - f_1}$$

in which R denotes said photographic distance sensed by said distance sensor, l denotes the overall length of said zoom lens, and $f_l$ denotes the focal length of said focusing lens group.

* * * * *